(12) United States Patent
Knepple et al.

(10) Patent No.: US 8,985,553 B2
(45) Date of Patent: Mar. 24, 2015

(54) PRESSURE PROTECTION VALVE

(75) Inventors: Robert Knepple, Kalamazoo, MI (US);
Andrew Bishop, Aiiegan, MI (US);
Paxton Augustine, Kalamazoo, MI (US); Leonardi J. Jabcon, Jr.,
Kalamazoo, MI (US)

(73) Assignee: Parker Hannifin Corporation,
Cleveland, OH (US)

( * ) Notice: Subject to any disclaimer, the term of this patent is extended or adjusted under 35 U.S.C. 154(b) by 0 days.

(21) Appl. No.: 13/387,794

(22) PCT Filed: Aug. 10, 2010

(86) PCT No.: PCT/US2010/044965
§ 371 (c)(1),
(2), (4) Date: Apr. 9, 2012

(87) PCT Pub. No.: WO2011/019687
PCT Pub. Date: Feb. 17, 2011

(65) Prior Publication Data
US 2012/0186668 A1    Jul. 26, 2012

Related U.S. Application Data

(60) Provisional application No. 61/232,541, filed on Aug. 10, 2009.

(51) Int. Cl.
*F16K 1/00* (2006.01)
*F16K 17/04* (2006.01)
*F16K 24/04* (2006.01)

(52) U.S. Cl.
CPC ............. *F16K 17/0446* (2013.01); *F16K 24/04* (2013.01)
USPC ............................ 251/330; 251/325; 137/495

(58) Field of Classification Search
CPC ..................................................... F16L 27/082
USPC .......................... 137/494, 495–499, 853, 860;
285/272–282; 251/333, 325, 330, 148
See application file for complete search history.

(56) References Cited

U.S. PATENT DOCUMENTS 1,687,317 A    11/1928  Archer
1,854,518 A *  4/1932   Little ........................ 137/516.15
(Continued)

FOREIGN PATENT DOCUMENTS

DE    8605871    4/1986
EP    2003380    12/2008

OTHER PUBLICATIONS

International Search Report for corresponding Patent Application No. PCT/US2010/044965 dated Dec. 20, 2010.

*Primary Examiner* — John K Fristoe, Jr.
*Assistant Examiner* — Angelisa Hicks
(74) *Attorney, Agent, or Firm* — Renner, Otto, Boisselle & Sklar, LLP

(57) ABSTRACT

A pressure protection valve (10) is provided featuring a swivelable output port fitting (40) and a valve element (60) having a portion (64) configured to redirect a portion of the fluid flow toward the fixed seat (30) upon initial opening of the valve (10). The valve element (60) is in a portion of the fitting that is inserted into a pressure container so as to be protected from external forces. The valve (10) may also include a vent cover (110) sealing the vent port (80), the vent cover (110) movable to vent pressure through the vent port (80) when the valve (10) opens and to relieve pressure through the vent port (80) when the valve (10) closes.

20 Claims, 11 Drawing Sheets

(56) References Cited

U.S. PATENT DOCUMENTS

| | | | |
|---|---|---|---|
| 2,101,938 A * | 12/1937 | Giberson | 285/94 |
| 2,525,799 A * | 10/1950 | Hecker | 137/515.7 |
| 2,655,391 A * | 10/1953 | Atkins | 285/275 |
| 3,236,256 A | 2/1966 | Valentine | |
| 3,630,197 A * | 12/1971 | Hirano | 128/204.26 |
| 3,993,361 A | 11/1976 | Stelzer | |
| 4,215,718 A | 8/1980 | Rosaen et al. | |
| 4,565,211 A * | 1/1986 | Denney | 137/321 |
| 4,688,830 A * | 8/1987 | Meisinger et al. | 285/100 |
| 4,856,756 A | 8/1989 | Combs | |
| 7,213,611 B2 | 5/2007 | Flynn | |
| 2006/0196542 A1 | 9/2006 | Yen | |

* cited by examiner

PRESSURE PROTECTION VALVE

CROSS REFERENCE TO RELATED APPLICATIONS

The present application claims the benefit of the filing date of U.S. Provisional Patent Application Ser. No. 61/232,541, filed Aug. 10, 2009, the disclosure of which is incorporated herein by reference in its entirety.

TECHNICAL FIELD

The present invention relates to a pressure protection valve for commercial vehicle air brake systems or other suitable applications.

BACKGROUND

A pneumatic system having a central air compressor is used to simultaneously provide pressurized air to two pneumatic circuits. The first pneumatic circuit is known as a critical circuit, which provides pressurized air to critical components, and the second is commonly referred to as an auxiliary circuit, which serves auxiliary components. If a leak or catastrophic failure occurs in one of the circuits, air pressure may be reduced in the critical circuit to below minimum operating parameters, thereby causing the loss of operation of critical components. To mitigate this effect, a pressure protection valve may be installed between the compressor and the auxiliary circuit. The pressure protection valve, upon sensing a loss of air pressure in the inlet of the pressure protection valve due to a leak or failure in either circuit, will isolate the auxiliary circuit from the compressor, preserving pressurized air for the critical circuit.

Pressure protection valves are particularly used in Class 8 motor vehicles which are manufactured with a pneumatic system that includes a critical circuit and an auxiliary circuit. The critical components served by the critical circuit typically include a primary pneumatic braking system and a secondary pneumatic braking system. The auxiliary circuit typically serves auxiliary components such as an exhaust brake, air horn, or air suspension systems.

However, existing pressure protection valves have various limitations. Existing valves have many components making them expensive to manufacture and susceptible to failures and are often difficult to install and orient to connecting air lines.

BRIEF DESCRIPTION OF THE DRAWINGS

Embodiments of this invention will now be described in further detail with reference to the accompanying drawings, in which.

DETAILED DESCRIPTION

Figure 1:
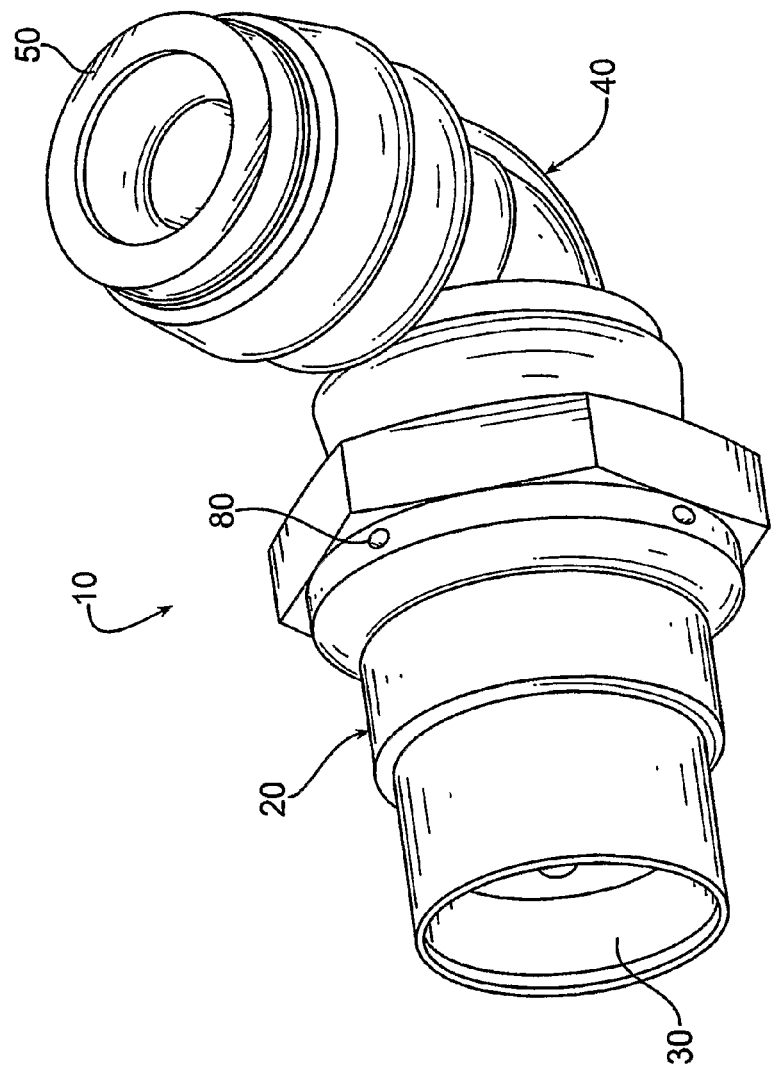
FIG. 1 is a perspective view of an embodiment of the pressure protection valve of the present invention.
Figure 2:
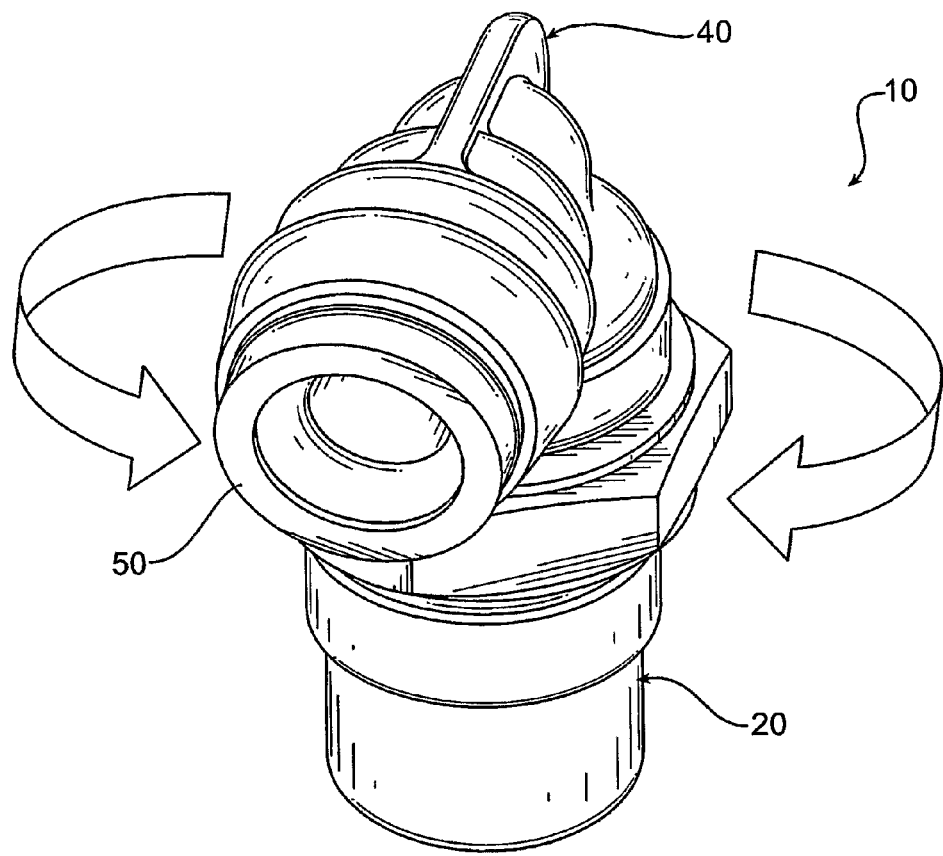
FIG. 2 is a perspective view of the pressure protection valve shown in FIG. 1 showing rotation of the output port.
Figure 3:
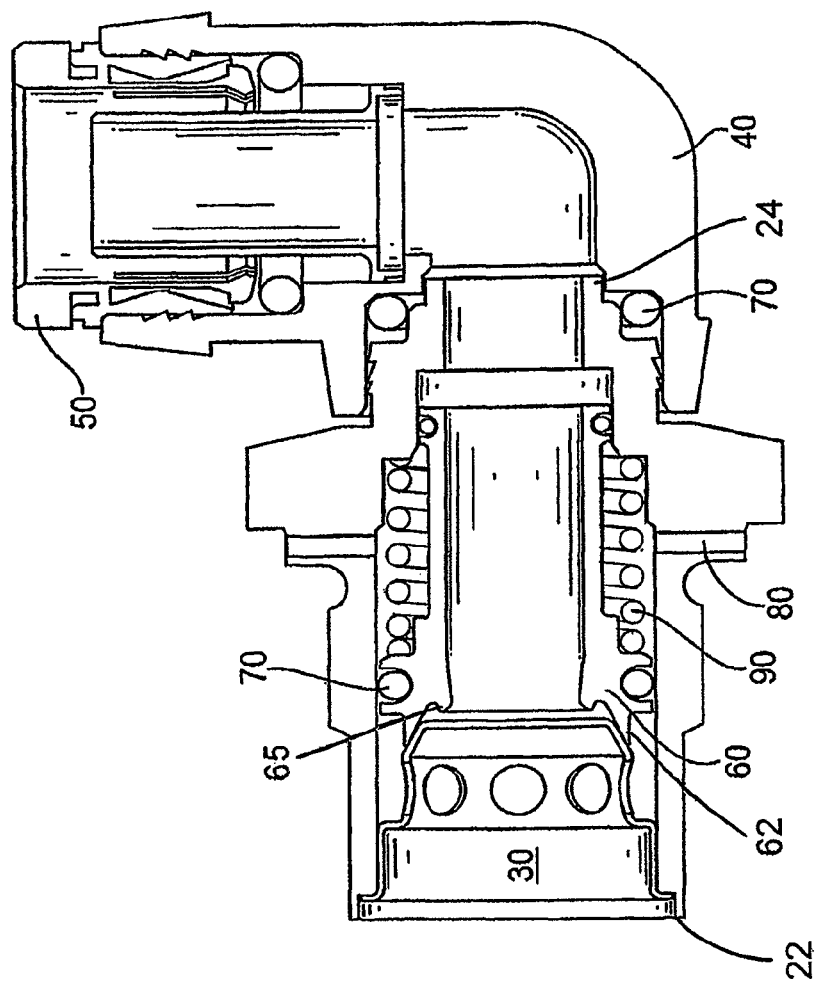
FIG. 3 is an axial, cross-sectional view of the pressure protection valve shown in FIG. 1.

An embodiment of the present invention is shown in FIGS. 1-3 as a pressure protection valve 10. The valve 10 comprises a body 20 having an inlet 22 and an outlet 24, fixed seat 30, upper swivel portion 40, outlet 50, moving sleeve 60, and seals 70. The valve 10 combines a standard fluid fitting and pressure protection valve in one compact, lightweight, and high flow package. The upper swivel portion 40 having outlet 50 is rotatable 360 degrees while the body 20 remains fixed. This allows easy and convenient alignment of the output ports to connecting airlines, minimizing tube binding or kinking.

The moving sleeve 60 is best shown in FIG. 3. The moving sleeve 60 automatically opens and closes at set pressure differentials at the inlet and outlet against a biasing force from spring 90 positioned within the body 20 of the valve. The geometry of the moving sleeve 60 includes a sealing lip 62 that seals against the fixed seat 30. The moving sleeve 60 also includes a portion 64 having a geometry that redirects flow passing between the lip 62 and the fixed seat 30, back toward the fixed seat 30 in a manner urging the sleeve 60 away from the fixed seat 30. As shown, portion 64 is an annular groove formed in a leading face 65 of the sleeve 60 leading radially inward from the sealing lip 62.

Figure 4:
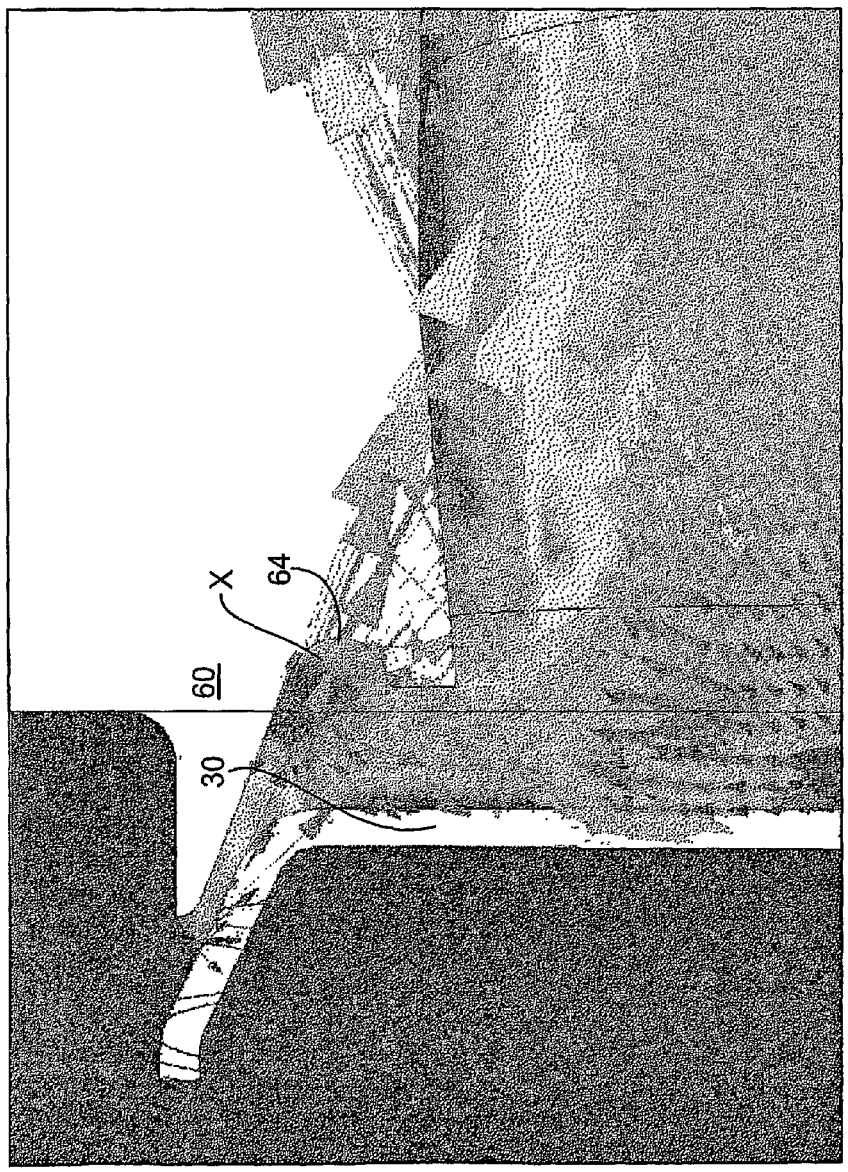
FIG. 4 is a finite element flow model of the pressure protection valve shown in FIG. 1 in a slightly open position.
Figure 5:
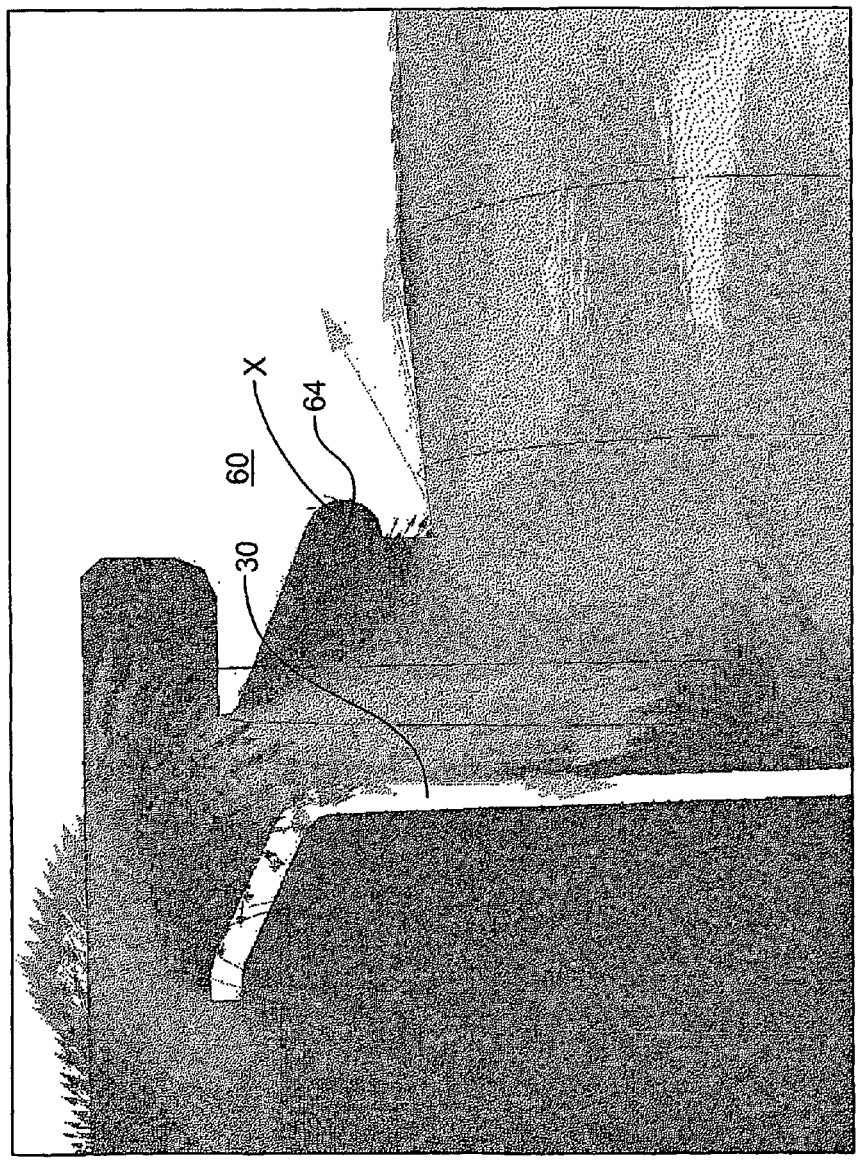
FIG. 5 is a finite element flow model of the pressure protection valve shown in FIG. 1 in a fully open position.

Referring to FIGS. 4 and 5, a finite element analysis of flow is shown in the slightly open and fully open position, respectively. As the moving sleeve 60 starts to open, the curved sleeve geometry 64 redirects the initial fluid flow back toward the fixed seat 30 as shown by the flow vectors passing through point X, providing extra initial opening force for quicker response, minimizing the effects of the pressure drop across the seat as shown in FIG. 4. In the fully opened position, the sleeve geometry 64 now has minimal effect on the fluid flow as shown by the lack of flow vectors at point X.

Figure 6:
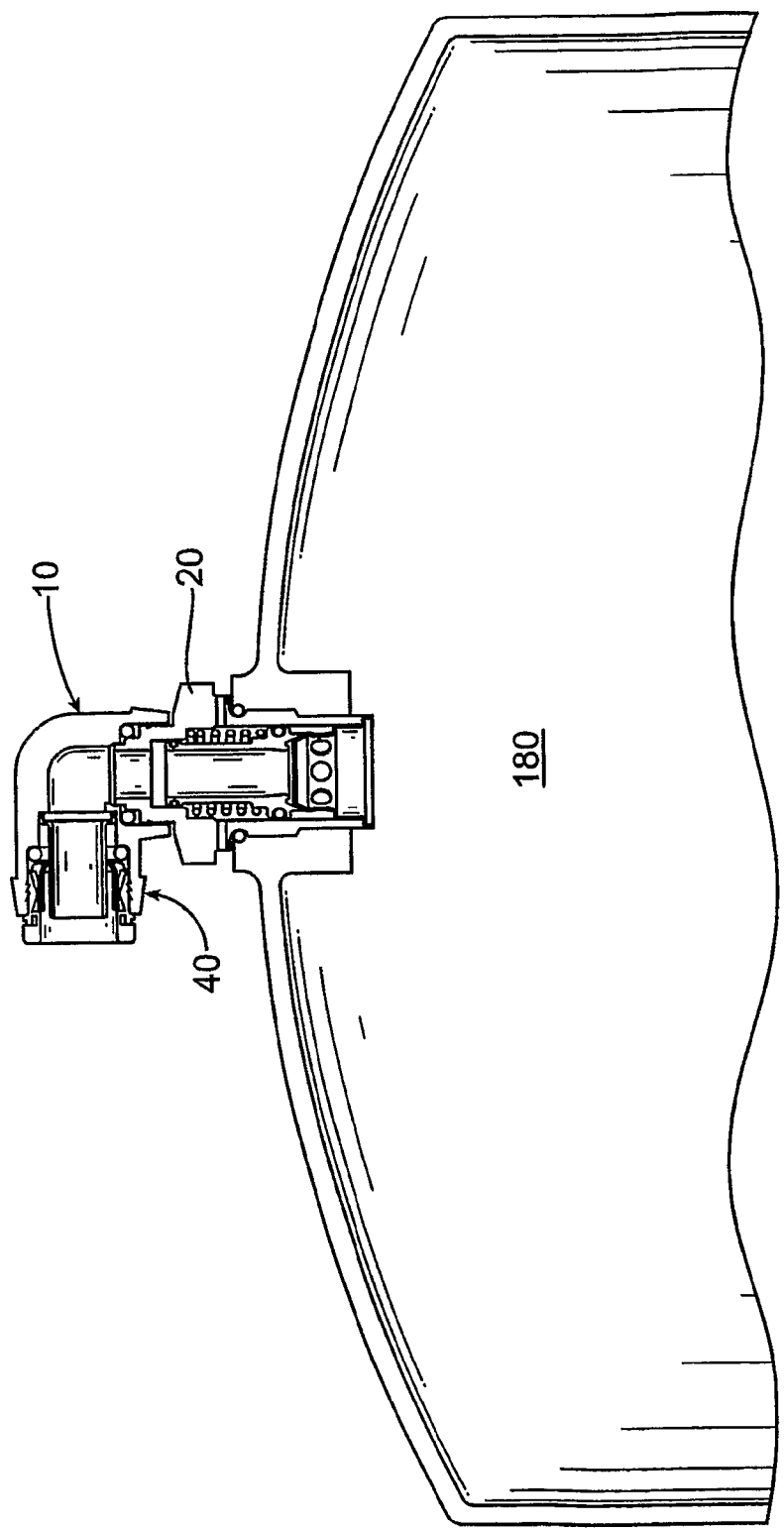
FIG. 6 is an axial, cross-sectional view of the pressure protection valve of FIG. 1 attached to an air reservoir.

Prior art valves are typically in the form of a separate unit that must be attached via fittings to the outside of the air reservoir. Referring to FIG. 6, the valve 10 is shown attached to an air reservoir 180. The valve 10 is formed as a conventional fitting, saving space and components while locating the majority of the working components securely inside the air tank 80 and the heavy fitting body 20. If the upper swivel portion 40 of the valve 10 is dislodged due to impact, the valve can remain functional, protecting the air reservoir pressure.

Figure 7:
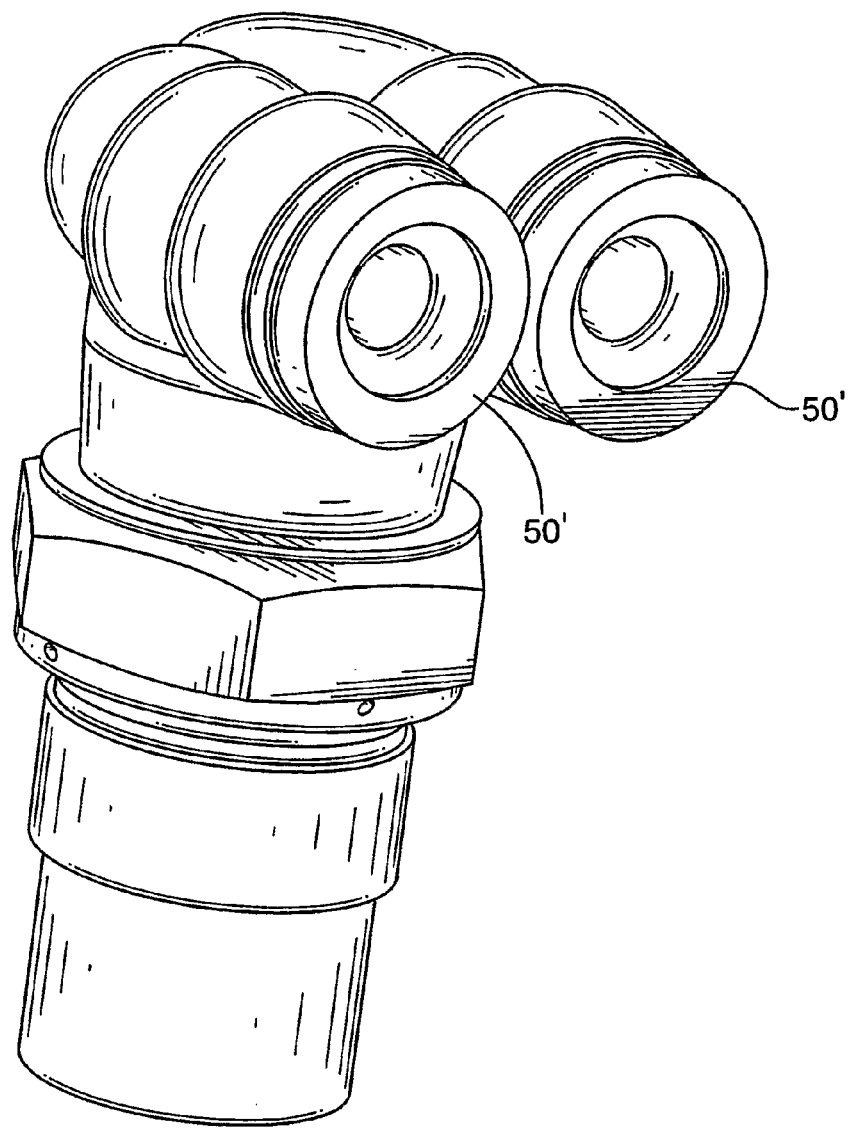
FIG. 7 is a perspective view of an embodiment of the pressure protection valve of the present invention having two outlet ports.
Figure 8:
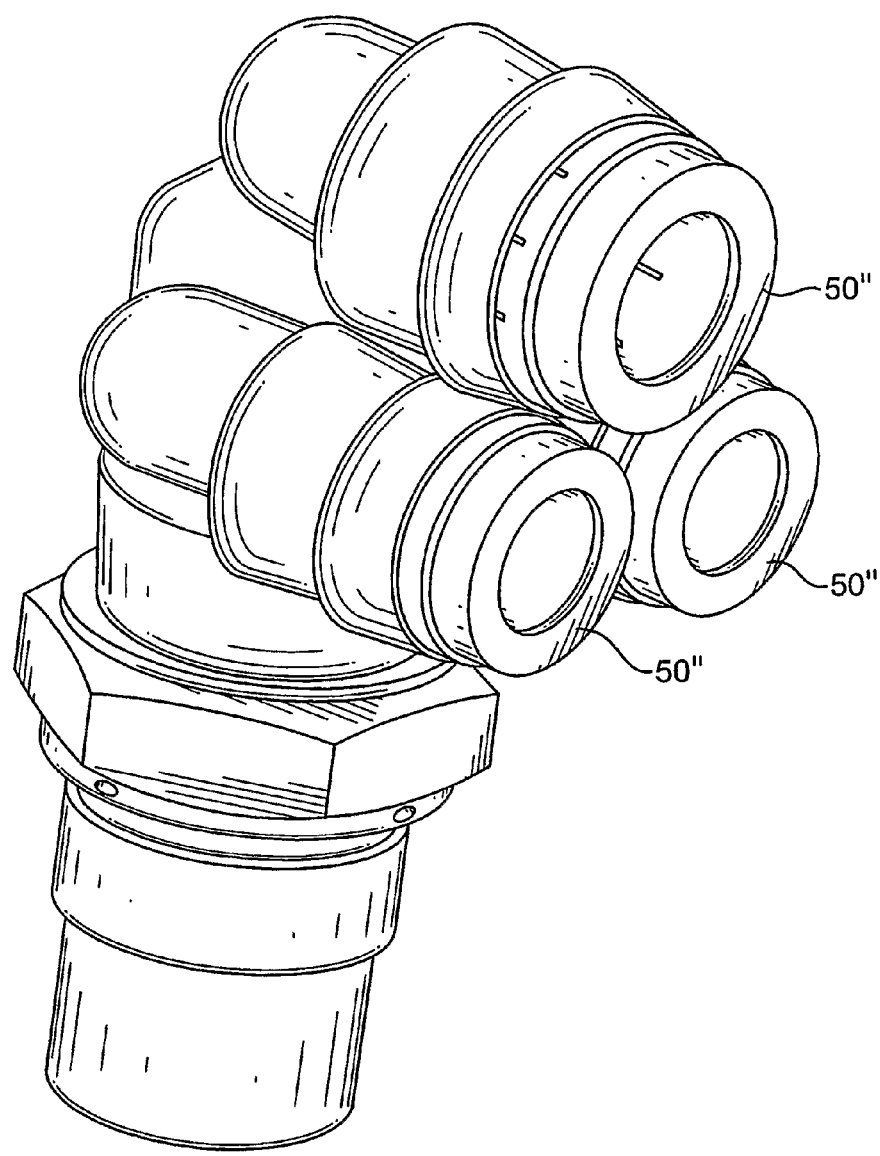
FIG. 8 is a perspective view of an embodiment of the pressure protection valve of the present invention having three outlet ports.
Figure 9:
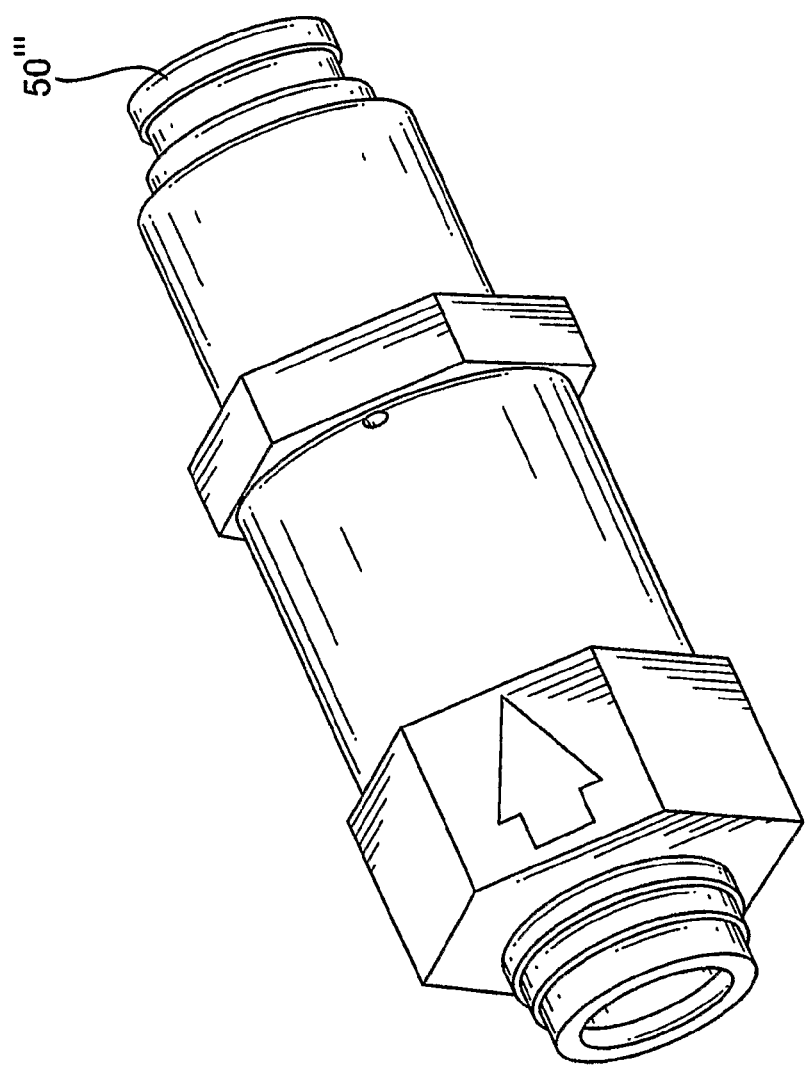
FIG. 9 is a perspective view of an inline embodiment of the pressure protection valve of the present invention.

The pressure protection valve is modular such that the swivel outlet portion 50 may have multiple outlet configurations to suit customer applications while reducing overall air brake system component, complexity, and cost. A double outlet 50', triple outlet 50", and inline configuration 50''' is shown in FIGS. 7, 8, and 9, respectively.

Figure 10:
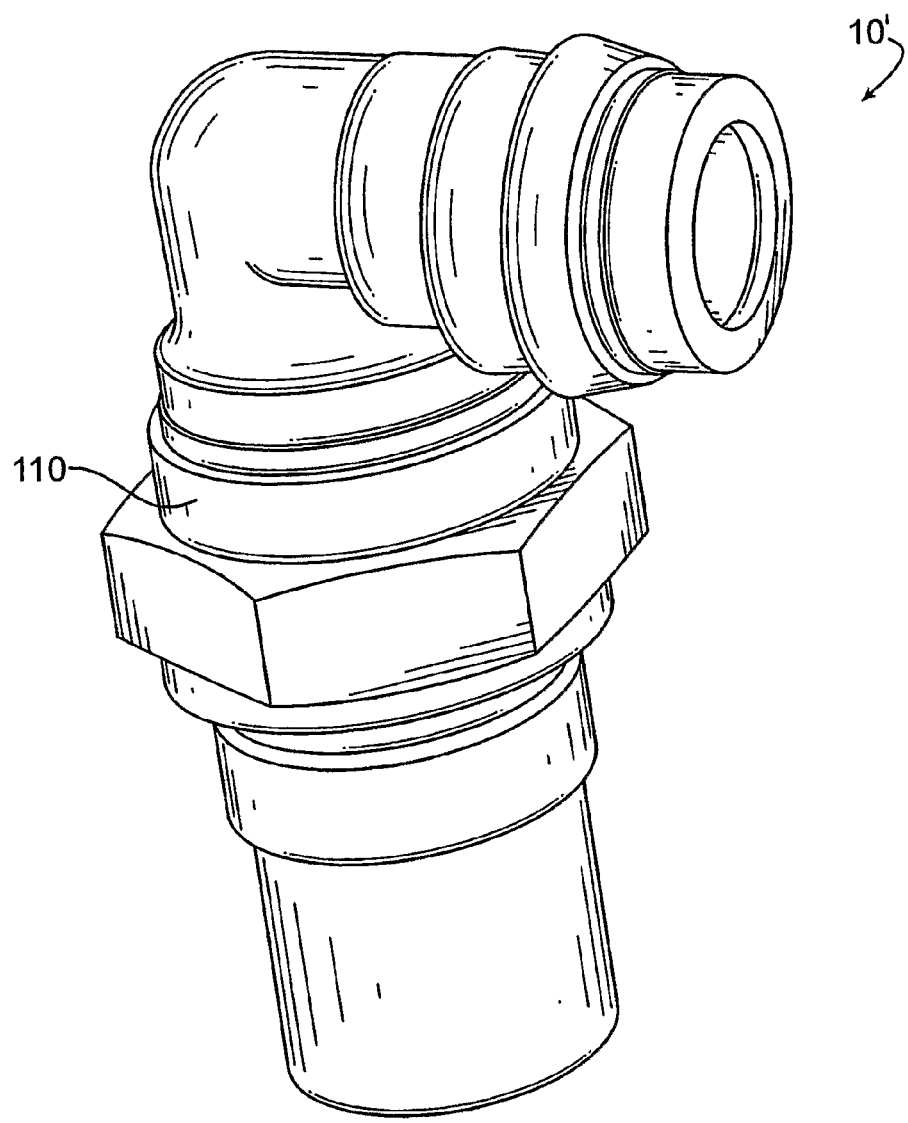
FIG. 10 is a perspective view of an embodiment of the pressure protection valve of the present invention having a vent shield.
Figure 11:
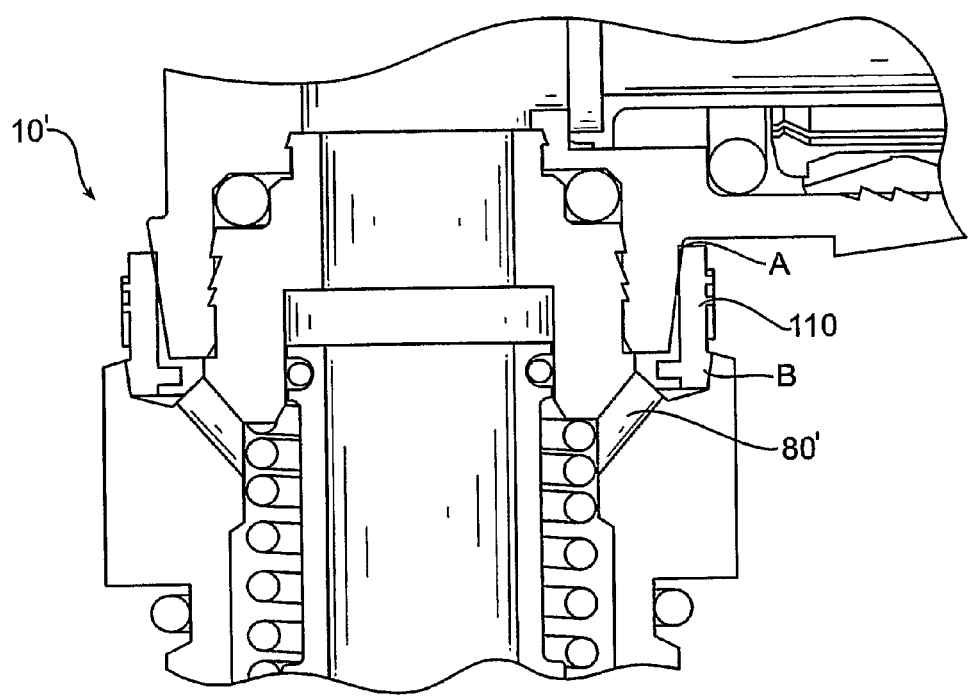
FIG. 11 is a cross-sectional view of the valve of FIG. 10.

The typical pressure protection valve has an atmospheric vent 80 which is completely open and subject to intrusion by dirt, road debris, and fluids—such as the vent 80 shown in FIGS. 1 and 3. In the embodiment shown in FIGS. 10 and 11, a pressure protection valve 10' including a vent shield 110 attached to minimize the entry of contaminants into the valve 10'. The geometry and flexible material allow the vent shield 110 to serve as both a shield and as a valve that reacts to the slight pressure differentials that take place as the pressure protection valve 10' shifts between open and closed states. The vent shield 110 seals the vent ports 80' at all times, except when the pressure protection valve is in the open/close shifting state. Being that a typical pressure protection valve normally shifts state only during vehicle start up and shut down, the vent shield 110 will keep the majority of contamination out of the valve. The vent 110 shield also serves as an identification band.

The vent shield 110 is made from a flexible material that allows it to act as a valve. The vent 110 shield spans between a portion of the body 20 and upper swivel portion 40 in a manner that does not prevent the rotation of the upper swivel portion 40. The geometry of the vent shield 110 allows sealing at two points, A & B, with point A being on the upper swivel portion 40 and point B being on the body 20. These points also serve as "pivot" points when differential pressures act upon the shield 110. When the pressure protection valve shifts open, positive pressure is created in the atmospheric vent port 80'. This positive pressure causes the shield to pivot at point B, and flex open at point A to vent the pressure. When the pressure is equalized, point A returns to its normal sealed position. Conversely, when the pressure protection valve shifts to a closed state, a vacuum is created in the atmospheric vent port 80' which causes the shield to pivot at point A, and allow point B to flex inward, relieving the vacuum and equalizing the pressure differential.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

The invention claimed is:

1. A valve comprising:
   a fitting housing having an inlet and an outlet fluidly connected by a fluid flow path;
   an output port fitting swivelably attached to the outlet of the fitting;
   a seat member fixedly positioned in the inlet of the fitting;
   a sleeve having a sealing lip and a radially outwardly opening groove and being slidable within the fitting housing between a first open position in which the sealing lip is spaced from the seat member and a second closed position in which the sealing lip seals against the seat member; and
   a seal disposed in the radian outwardly opening groove to seal the sleeve to the fitting housing,
   wherein the sleeve has an axially opening annular groove formed in a leading face of the sleeve so that fluid which flows between the seat member and the sealing lip on the sleeve when the valve is initially opened is directed into the groove which then redirects a portion of that fluid toward the seat member,
   wherein the leading face of the sleeve is adjacent the seat member and the annular groove is formed in the leading face of the sleeve radially inward from the sealing lip.

2. The valve of claim 1, further comprising a vent port in the fitting housing.

3. The valve of claim 2, further comprising a vent cover sealing the vent port, the vent cover movable to vent pressure through the vent port when the valve opens and to relieve pressure through the vent port when the valve closes.

4. The valve of claim 3, wherein the vent cover having a first portion sealing against the fitting housing and a second portion sealing against the upper swivel portion.

5. The valve of claim 4, wherein the second portion of the vent cover moves generally radially outward to allow pressure through the vent port.

6. The valve of claim 4, wherein the first portion of the vent cover moves generally radially inward to relieve pressure through the vent port.

7. The valve of claim 4, wherein an outer surface of the first portion seals against the fitting housing and an inner surface of the second portion seals against the upper swivel portion.

8. The valve of claim 1, wherein the seat member and the valve element are positioned in a portion of the fitting housing which is insertable into a coupling of a pressurized container.

9. The valve of claim 1, further comprising a biasing element biasing the valve element toward the fixed seat.

10. A pressurized container which has fitted to it a pressure protection valve according to claim 1.

11. The valve of claim 1, wherein the sleeve has a first end and a second end, and wherein the sealing lip is at the first end and the radially outwardly opening groove is near the first end.

12. The valve of claim 11, further including a second seal that seals the sleeve to the fitting housing, wherein the sleeve has a radially outwardly opening groove near the second end that receives the second seal.

13. The valve of claim 1, further including a resilient member biasing the sleeve in the closed position, wherein a first end of the resilient member is seated on a ledge of the sleeve formed by a wall of the radially outwardly opening groove, and a second end of the resilient member is seated on a ledge in the fitting housing.

14. The valve of claim 1, wherein the output port fitting is swivelably attached to the outlet of the fitting such that the outlet port fitting is rotatable 360 degrees relative to the fitting housing without moving axially relative to the fitting housing.

15. A valve comprising: a fitting housing having an outlet fluidly connected by a fluid flow path; an output port fitting attached to the outlet of the fitting; a seat member secured in the inlet of the fitting; a sleeve disposed in and being slideable within the fitting housing, the sleeve having a first end, a second end, a sealing lip at the first end, a radially outwardly opening groove, and an axially opening annular groove formed in a leading face of the sleeve adjacent the seat member radially inward from the sealing lip; and a seal disposed in the radially outwardly opening groove to seal the sleeve to the fitting housing, whereby fluid flows between the seat member and the sealing lip when the valve is initially opened is directed into the annular groove, which then redirects a portion of that fluid toward the seat member.

16. The valve of claim 15, wherein the sleeve is movable within the fitting housing between a first open position in which the sealing lip is spaced from the seat member and a second closed position in which the sealing lip seals against the seat member.

17. A valve comprising: a fitting housing having an inlet and an outlet fluidly connected by a fluid flow path; an output port fitting attached to the outlet of the fitting; a seat member secured in the inlet of the fitting; and a sleeve having an axis, a sealing lip, a radially outwardly opening groove, and an axially opening annular groove formed in a leading face of the sleeve adjacent the seat member opening towards the seat member, and a seal disposed in the radially outwardly opening groove to seal the sleeve to the fitting housing, wherein the sleeve is movable within the fitting housing between a first open position in which the sealing lip is spaced from the seat member and a second closed position in which the sealing lip seals against a radially, outwardly facing surface of the seat member, and whereby fluid that flows between the seat member and the sealing lip when the valve is initially opened is directed into the annular groove, which then redirects a portion of that fluid toward the seat member.

18. The valve of claim 17, wherein the sealing lip surrounds the axially opening annular groove.

19. The valve of claim 17, further comprising a vent port in the fitting housing.

20. The valve of claim 19, further comprising a vent cover sealing the vent port, the vent cover movable to vent pressure through the vent port when the valve opens and to relieve pressure through the vent port when the valve closes.

* * * * *

UNITED STATES PATENT AND TRADEMARK OFFICE
CERTIFICATE OF CORRECTION

PATENT NO. : 8,985,553 B2
APPLICATION NO. : 13/387794
DATED : March 24, 2015
INVENTOR(S) : Robert Knepple et al.

It is certified that error appears in the above-identified patent and that said Letters Patent is hereby corrected as shown below:

Title Page, Second Line of Item (75), "Aiiegan, MI (US)," should read -- Allegan, MI (US) --.

Title Page, Fourth Line of Item (75), "Leonardi J. Jabcon, Jr." should read -- Leonard J. Jabcon, Jr., --.

Signed and Sealed this
Fifth Day of April, 2016

Michelle K. Lee
*Director of the United States Patent and Trademark Office*